(12) United States Patent
Yamamoto

(10) Patent No.: US 8,253,984 B2
(45) Date of Patent: Aug. 28, 2012

(54) FACSIMILE MACHINE, FACSIMILE NOTIFICATION SYSTEM, AND COMMUNICATION TERMINAL DEVICE

(75) Inventor: Kazuya Yamamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 717 days.

(21) Appl. No.: 12/385,857

(22) Filed: Apr. 22, 2009

(65) Prior Publication Data

US 2009/0295540 A1   Dec. 3, 2009

(30) Foreign Application Priority Data

May 30, 2008   (JP) .................................. 2008-142898

(51) Int. Cl.
*H04N 1/00* (2006.01)
*G06F 3/12* (2006.01)
*H04M 11/00* (2006.01)

(52) U.S. Cl. ........ 358/405; 358/402; 358/403; 358/440; 358/1.15; 379/100.08

(58) Field of Classification Search ................. 358/1.14, 358/1.15, 400, 402, 403, 405, 434, 440; 379/100.01, 379/100.08, 100.09; 726/5, 21; 713/161, 713/184
See application file for complete search history.

(56) References Cited

U.S. PATENT DOCUMENTS

| | | | | |
|---|---|---|---|---|
| 5,692,036 | A * | 11/1997 | Saito | 379/216.01 |
| 6,108,103 | A * | 8/2000 | Kurozasa | 358/405 |
| 6,480,958 | B1 * | 11/2002 | Harrington | 713/184 |
| 6,731,731 | B1 * | 5/2004 | Ueshima | 379/196 |
| 7,042,595 | B2 * | 5/2006 | Mitani | 358/402 |
| 7,095,830 | B1 * | 8/2006 | Hamaguchi | 379/93.02 |
| 7,679,760 | B2 * | 3/2010 | Inoue et al. | 358/1.14 |
| 2003/0095289 | A1 * | 5/2003 | Mitani | 358/402 |
| 2004/0190053 | A1 | 9/2004 | Okada et al. | |
| 2004/0233471 | A1 * | 11/2004 | Inoue et al. | 358/1.14 |
| 2005/0055433 | A1 * | 3/2005 | Mathew et al. | 709/223 |
| 2007/0127054 | A1 | 6/2007 | Nishizawa | |
| 2007/0136483 | A1 * | 6/2007 | Lee et al. | 709/229 |
| 2008/0040798 | A1 * | 2/2008 | Inoue | 726/21 |
| 2009/0249454 | A1 * | 10/2009 | Yamamoto et al. | 726/5 |

FOREIGN PATENT DOCUMENTS

| | | |
|---|---|---|
| EP | 1069758 A2 | 1/2001 |
| JP | 03-192456 A | 8/1991 |
| JP | 05-011875 A | 1/1993 |
| JP | 06-105171 A | 4/1994 |
| JP | 10-145422 A | 5/1998 |
| JP | 2001-111845 A | 4/2001 |
| JP | 2005-294945 A | 10/2005 |
| JP | 2005-333561 | 12/2005 |
| JP | 2006-345043 A | 12/2006 |
| JP | 2007-013417 A | 1/2007 |
| WO | WO-98/23082 A1 | 5/1998 |

\* cited by examiner

*Primary Examiner* — Kimberly A Williams
(74) *Attorney, Agent, or Firm* — Rabin & Berdo, P.C.

(57) ABSTRACT

A facsimile machine receives image data, generates a password for received image data, assigns the generated password to the received image data, and stores the received image data. Information indicating a notification destination is extracted from the received image data, and the notification destination is notified of the password. The received image data are output responsive to subsequent input of the password at the facsimile machine. This scheme provides password protection without forcing users to register and remember passwords, and without the risk that a compromised password may be used for unauthorized output of facsimile data received later.

24 Claims, 13 Drawing Sheets

- 51 RECEIVED DATA STORE
- 52 CORRESPONDENCE TABLE

STORAGE UNIT
5

| RECEIVED DATA NO. | PASSWORD | START ADDR. | END ADDR. |
|---|---|---|---|
| 1 | PASSWORD-1 | 0x00000000 | 0x0000FFFF |
| 2 | PASSWORD-2 | 0x00010000 | 0x0002FFFF |
| 3 | PASSWORD-3 | 0x00030000 | 0x0006FFFF |
| ⋮ | ⋮ | ⋮ | ⋮ |
| n | PASSWORD-n | 0x00200000 | 0x0023FFFF |

CORRESPONDENCE TABLE
52

FIG.8
A FAX ADDRESSED TO xxxx@aa.co.jp HAS BEEN RECEIVED. THE PASSWORD FOR OBTAINING THE OUTPUT IS GIVEN BELOW.
PASSWORD : ab12cd34
FIG.9
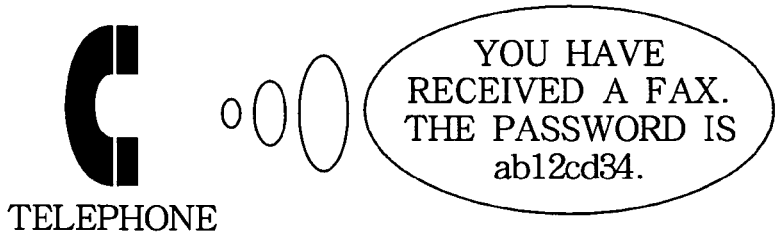
TELEPHONE
YOU HAVE RECEIVED A FAX. THE PASSWORD IS ab12cd34.
FIG.10
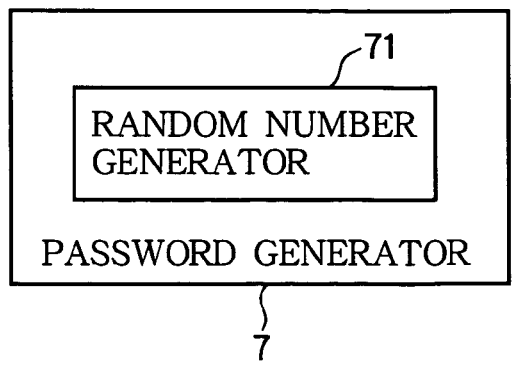

FIG.13

| RECEIVED DATA NO. | PASSWORD | START ADDR. | END ADDR. | NOTIFICATION E-MAIL ADDR. | NOTIFICATION TELEPHONE NO. |
|---|---|---|---|---|---|
| 1 | PASSWORD-1 | 0x00000000 | 0x0000FFFF | xxx@aa.co.jp | |
| 1 | PASSWORD-2 | 0x00000000 | 0x0000FFFF | yyy@aa.co.jp | |
| 1 | PASSWORD-3 | 0x00000000 | 0x0000FFFF | zzz@aa.co.jp | |
| ...... | ...... | ...... | ...... | ...... | |
| n | PASSWORD-n | 0x00200000 | 0x0023FFFF | | |

CORRESPONDENCE TABLE ~52

FIG.15

| RECEIVED DATA NO. | PASSWORD | START ADDR. | END ADDR. | NOTIFICATION E-MAIL ADDR. | NOTIFICATION TELEPHONE NO. | PASSWORD GENERATION TIME |
|---|---|---|---|---|---|---|
| 1 | PASSWORD-1 | 0x00000000 | 0x0000FFFF | xxx@aa.co.jp | | 5/1 09 : 10 : 05 |
| 2 | PASSWORD-2 | 0x00010000 | 0x0002FFFF | | 123-456-789 | 5/1 10 : 35 : 10 |
| 3 | PASSWORD-1 | 0x00030000 | 0x0006FFFF | xxx@aa.co.jp | | 5/1 12 : 55 : 00 |
| 4 | PASSWORD-3 | 0x00070000 | 0x0007FFFF | xxx@aa.co.jp | | 5/7 13 : 00 : 45 |
| …… | …… | …… | …… | …… | …… | …… |
| n | PASSWORD-n | 0x00200000 | 0x0023FFFF | yyy@aa.co.jp | | m/d hh : mn : ss |

CORRESPONDENCE TABLE ~ 52

FACSIMILE MACHINE, FACSIMILE NOTIFICATION SYSTEM, AND COMMUNICATION TERMINAL DEVICE

BACKGROUND OF THE INVENTION

1. Field of the Invention

The present invention relates to a communication terminal device that outputs received data, such as a facsimile machine that prints out received image data. More particularly, the invention relates to a notification system that can prevent output of the data by unintended persons without requiring advance registration of a password.

2. Description of the Related Art

There are facsimile machines that do not immediately print out received data but first store the data in an internal memory and print the data later in response to input of an identifier (ID), or an ID and a password. A conventional facsimile machine of this type is described by Hatakeyama in Japanese Patent Application Publication No. 2005-333561 (page 4 and FIG. 2). The IDs and passwords used by this facsimile machine are stored sequences of digits that each user pre-registers in the machine.

IDs and passwords of this type, however, are notoriously vulnerable to accidental or surreptitious acquisition by third parties, who can then print out received data that they were not meant to see.

Another problem is that it is troublesome for legitimate users to have to register and then remember their IDs and passwords.

SUMMARY OF THE INVENTION

An object of the present invention is to solve these problems by providing a facsimile machine, a facsimile notification system, and a communication terminal device that can prevent unauthorized use of passwords and other identification information while saving trouble for legitimate users.

The invention provides a novel facsimile machine having an assigning unit that generates a password for received data and assigns the generated password to the received data. A storage unit stores the received data. An extracting unit extracts information identifying a notification destination of the received data. A notification unit notifies the notification destination of the password. Subsequently, an output unit outputs the received data responsive to input of the password.

The invention also provides a novel facsimile notification system for a facsimile machine that stores received data and outputs the stored received data when a corresponding password is entered. The facsimile notification system includes an assigning unit that generates a password for received data and assigns the generated password to the received data, an extracting unit that extracts information identifying a notification destination of the received data, and a notification unit for notifying the notification destination of the password.

The invention further provides a novel communication terminal device with an assigning unit that generates a password for received data and assigns the generated password to the received data, a storage unit that stores the received data, an extracting unit that extracts information identifying a notification destination of the received data, a notification unit that notifies the notification destination of the password, and an output unit that outputs the received data responsive to input of the password.

The assigning unit in the novel facsimile machine, facsimile notification system, or communication terminal device can generate a different password for each item of received data, making it very difficult for an unauthorized third party to learn the password in time to use it to print or otherwise output the received data. Moreover, legitimate users are spared the trouble of registering and remembering personal passwords and user IDs.

BRIEF DESCRIPTION OF THE DRAWINGS

In the attached drawings:

FIG. 8 shows an exemplary document with password information generated in the first embodiment;

FIG. 9 illustrates exemplary audio data including password information generated in the first embodiment;

FIG. 10 a block diagram illustrating the structure of the password generator in FIG. 1;

FIG. 13 shows a password table used in a first variation of the first embodiment;

FIG. 15 shows a password table used in the second variation;

DETAILED DESCRIPTION OF THE INVENTION

Figure 1:
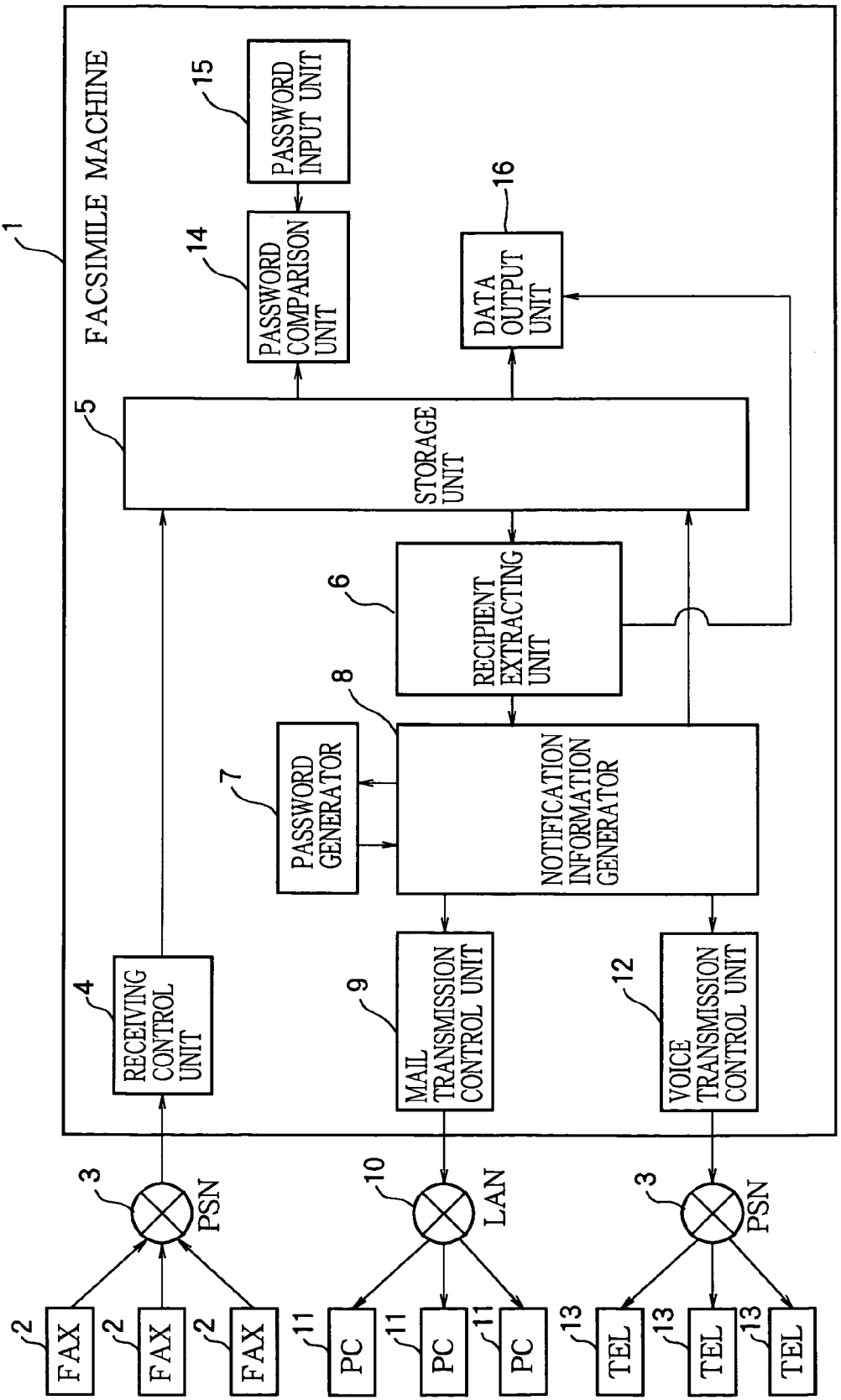
FIG. 1 is a block diagram illustrating the structure of a facsimile machine in a first embodiment of the invention.

Embodiments of the invention will now be described with reference to the attached drawings, in which like elements are indicated by like reference characters.

First Embodiment

Referring to FIG. 1, a facsimile machine 1 in the first embodiment of the invention is linked to one or more facsimile (FAX) terminals 2 and one or more telephone (TEL) sets 13 via a public switched network (PSN) 3, and linked to one or more personal computers (PCs) 11 via a local area network (LAN) 10. The description below assumes that the personal computers 11 and telephone sets 13 are disposed in a space shared by the users of the facsimile machine 1, such as one floor of a building, although the invention is not limited to this arrangement.

The facsimile machine 1 includes a receiving control unit 4 for receiving image data transmitted from the facsimile terminals 2, a storage unit 5 for storing image data received by the receiving control unit 4, a recipient extracting unit 6 for extracting information indicating the intended recipient from the received image data, a password generator 7 for generating a password for each item of received data, that is, for each received facsimile transmission, a notification information generator 8 for generating information (notification information) for notifying the intended recipient of the generated password, a mail transmission control unit 9 for transmitting the generated notification information as document data to one of the personal computers 11 by electronic mail, and a voice transmission control unit 12 for transmitting the generated notification information as synthesized voice data to one of the telephones 13.

The facsimile machine 1 further includes a password comparison unit 14, a password input unit 15, and a data output unit (printing unit) 16. These units enable a user who has been notified of a password to print out image data corresponding to the password. The password input unit 15 receives the password as entered by the user and sends the password to the password comparison unit 14. The password comparison unit 14 searches the storage unit 5 for a password identical to the entered password. If the search is successful, the data output unit 16 reads image data corresponding to the entered password from the storage unit 5 and prints out the image data.

Figures 2, 3:
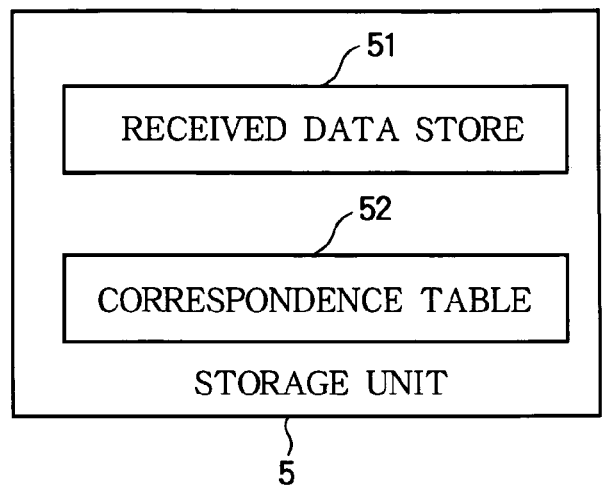
FIG. 2 is a block diagram illustrating the structure of the storage unit in FIG. 1.
FIG. 3 shows a password correspondence table used in the first embodiment.

Referring to FIG. 2, the storage unit 5 includes a received data store 51 and a correspondence table 52. The received data store 51 stores the image data sent from the receiving control unit 4. For each item of image data, the correspondence table 52 stores a password and related information specifying the storage location of the image data in the received data store 51.

Referring to FIG. 3, the correspondence table 52 is organized into a received data number column, a password column, a start address (ADDR.) column, and an end address column. A received data number identifies an item of received image data. A password is generated for each item of received data by using random numbers. The storage location of the received image data in the received data store 51 is specified by a start address and an end address. The start address indicates where the stored image data start, and the end address indicates where the stored image data end.

Figure 4:
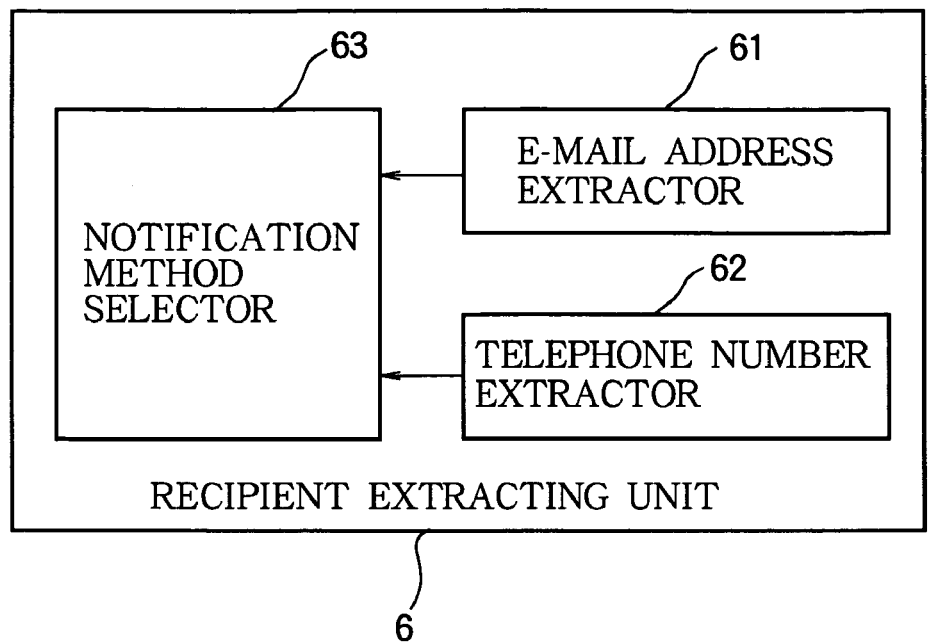
FIG. 4 is a block diagram illustrating the structure of the recipient extracting unit in FIG. 1.

Referring to FIG. 4, the recipient extracting unit 6 includes an e-mail address extractor 61, a telephone number extractor 62, and a notification method selector 63.

Figure 5:
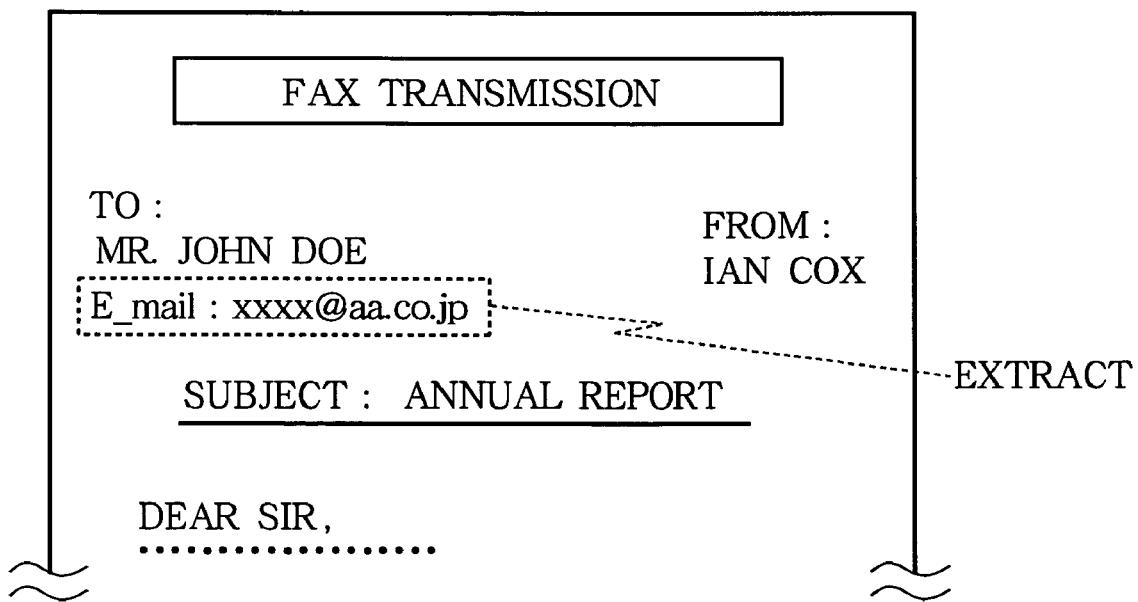
FIGS. 5 and 6 show exemplary received data.

When the received data store 51 stores received image data, the e-mail address extractor 61, using character recognition techniques, attempts to extract the electronic mail address (e-mail address) of the intended recipient from the received image data. In FIG. 5, for example, the received data include a cover page, entitled 'Fax Transmission', on which the intended recipient's e-mail address appears in the area surrounded by the dotted line. The e-mail address extractor 61 recognizes the character string 'E_mail:' and finds the '@' character in the following character string, enabling the e-mail address extractor 61 to identify the following character string as an e-mail address. The e-mail address extractor 61 then recognizes the other characters in the following character string to extract the intended recipient's e-mail address (xxxx@aa.co.jp).

Figure 6:
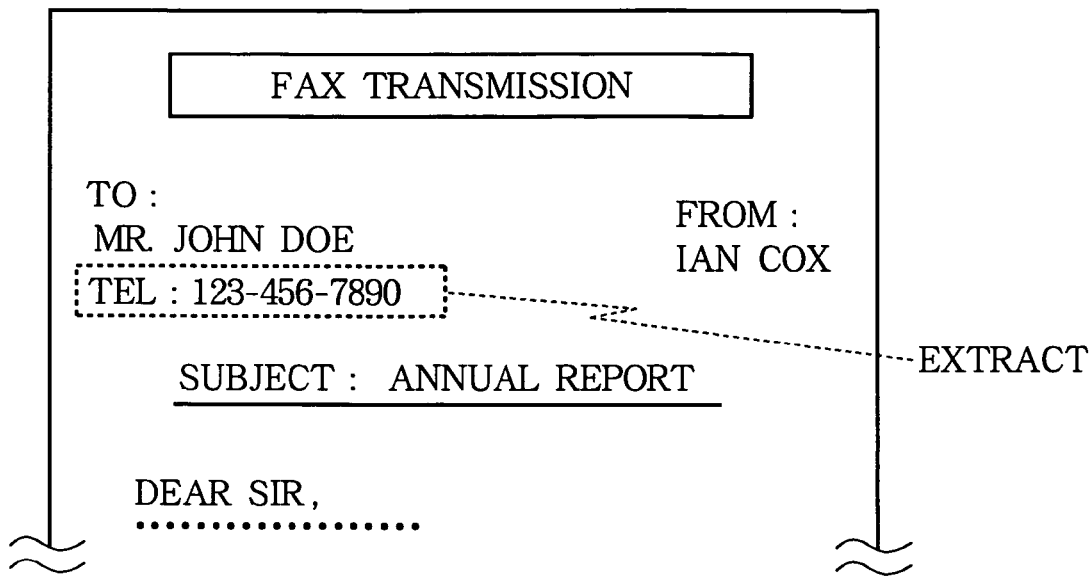

If the e-mail address extractor 61 cannot find an e-mail address in the received image data, the telephone number extractor 62 attempts to extract the telephone number of the intended recipient from the received image data. In FIG. 6, for example, the received 'fax transmission' cover page includes the intended recipient's telephone number in place of the e-mail address in FIG. 5. The telephone number extractor 62 uses character recognition techniques to recognize the character string 'TEL', or an equivalent character string such as 'telephone number', and extract the following digits (123-456-7890) as the intended recipient's telephone number.

The notification method selector 63 selects the method of informing the intended recipient of reception of the facsimile transmission and of the password. When the e-mail address extractor 61 extracts an e-mail address, the notification method selector 63 selects e-mail transmission of the password. When the e-mail address extractor 61 does not extract an e-mail address and the telephone number extractor 62 extracts a telephone number, the notification method selector 63 selects telephone transmission of the password. When neither an e-mail address nor a telephone number is extractable, the notification method selector 63 instructs the data output unit 16 to output the image data without waiting for password input.

Figure 7:
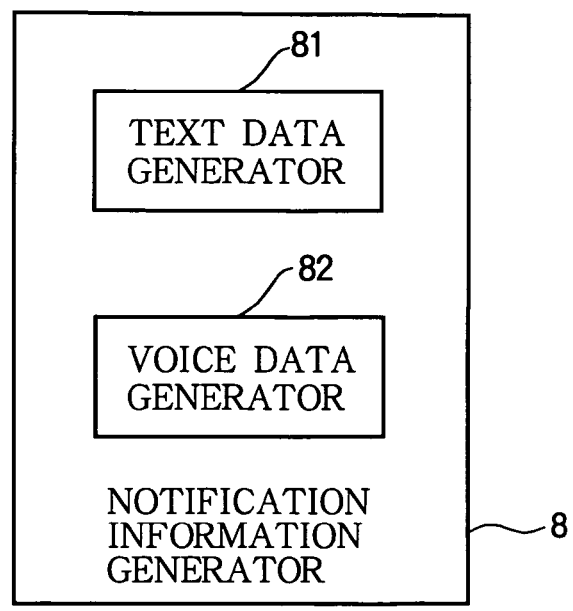
FIG. 7 is a block diagram illustrating the structure of the notification information generator in FIG. 1.

Referring to FIG. 7, the notification information generator 8 includes a text data generator 81 and a voice data generator 82.

When the notification method selector 63 selects transmission of the password by electronic mail, the text data generator 81 directs the password generator 7 to generate a password, and generates a document for notifying the intended recipient of the generated password. In the first embodiment, the text data generator 81 generates a document including the generated password information as shown in FIG. 8.

When the notification method selector 63 selects transmission of the password by telephone, the voice data generator 82 directs the password generator 7 to generate a password, and generates synthesized voice data for notifying the intended recipient of the generated password. In the first embodiment, the voice data generator 82 generates synthesized voice data including the generated password information as shown in FIG. 9.

Referring to FIG. 10, the password generator 7 includes a random number generator 71. When the notification information generator 8 directs the password generator 7 to generate a password, the random number generator 71 generates one or more random numbers and notifies the notification information generator 8 of the random numbers, or a random string of characters and digits derived from the random numbers, as a password for the image data. The random number generator 71 may generate random numbers by any known method, such as the linear congruential method or the M-sequence method.

The operation of the facsimile machine 1 will now be described.

Figure 11:
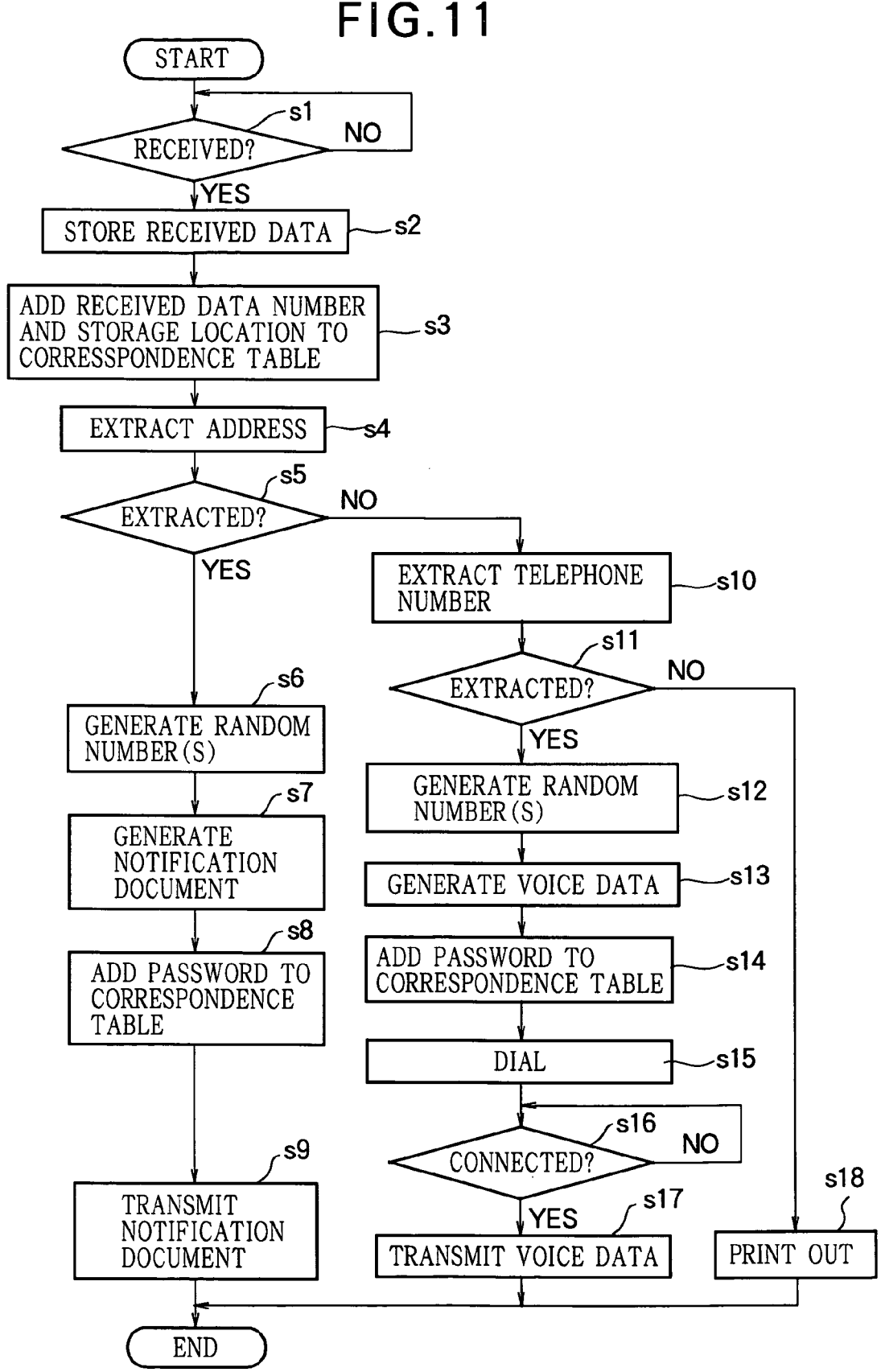
FIG. 11 is a flowchart illustrating operations from data reception to notification.

The process from receiving image data to informing the intended facsimile recipient of the arrival of the facsimile transmission and of the password is illustrated in the flowchart in FIG. 11.

The facsimile machine 1 waits to receive image data transmitted from a facsimile terminal 2 (step s1). When the receiving control unit 4 receives image data transmitted from a facsimile terminal 2 ('Yes' in step s1), the receiving control unit 4 sends the image data to the storage unit 5, which stores the image data in the received data store 51 (step s2). A received data number, and a start address and an end address specifying the storage location of the received image data, are added to the correspondence table 52, and the recipient extracting unit 6 is notified of the completion of the storing of the received image data (step s3).

When the recipient extracting unit 6 receives this notification, the e-mail address extractor 61 attempts to extract the e-mail address of the intended recipient from the received image data stored in the received data store 51 (step s4). If the e-mail address extractor 61 succeeds in extracting the e-mail address ('Yes' in step s5), the notification method selector 63 selects e-mail transmission of the password, and notifies the notification information generator 8 of the extracted e-mail address and the selection of e-mail transmission of the password. When the notification information generator 8 is notified, the text data generator 81 directs the password generator 7 to generate a password. The random number generator 71 generates a password by generating one or more random numbers and notifies the text data generator 81 (step s6). When notified of the e-mail address from the notification method selector 63 and the password from the password generator 7, the text data generator 81 generates document data for informing the intended recipient by e-mail of the arrival of the facsimile transmission and of the password (step s7). The text data generator 81 then writes the password received from the password generator 7 into the password column of the correspondence table 52, corresponding to the received image data (step s8). The mail transmission control unit 9 transmits the generated document data by e-mail to the notification destination, which is the personal computer 11 of the intended recipient (step s9).

If the e-mail address extractor 61 cannot find an e-mail address in the received image data ('No' in step s5), the e-mail address extractor 61 notifies the telephone number extractor 62 of the failure to find an e-mail address, and the telephone number extractor 62 attempts to extract the telephone number of the intended recipient from the received image data stored in the received data store 51 (step s10). If the telephone number extractor 62 cannot find a telephone number in the received image data ('No' in step s11), the notification method selector 63 instructs the data output unit 16 to output the received image data without waiting for password input, and the data output unit 16 reads the start address and the end address of the received image data from the correspondence table 52, reads the received image data from the storage location in the received data store 51 specified by the start and end addresses, prints out the received image data (step s18), and deletes the corresponding entry from the correspondence table 52.

If the telephone number extractor 62 succeeds in extracting a telephone number ('Yes' in step s11), the notification method selector 63 selects telephone transmission of the password, and notifies the notification information generator 8 of the extracted telephone number and the selection of telephone transmission of the password. The voice data generator 82 directs the password generator 7 to generate a password. The random number generator 71 generates a password by generating one or more random numbers and notifies the voice data generator 82 (step s12). When notified of the telephone number by the notification method selector 63 and the password by the password generator 7, the voice data generator 82 generates synthesized voice data for informing the intended recipient by telephone of the arrival of the facsimile transmission and of the password (step s13). The voice data generator 82 then writes the password received from the password generator 7 into the password column of the correspondence table 52, corresponding to the received image data, and notifies the voice transmission control unit 12 of the synthesized voice data and extracted telephone number (step s14). The voice transmission control unit 12 dials the extracted telephone number (step s15) and waits for a connection with the intended recipient's telephone 13 (step s16). When connected to the telephone 13 ('Yes' in step s16), the voice transmission control unit 12 informs the intended recipient of the password by synthesized voice (step s17).

Figure 12:
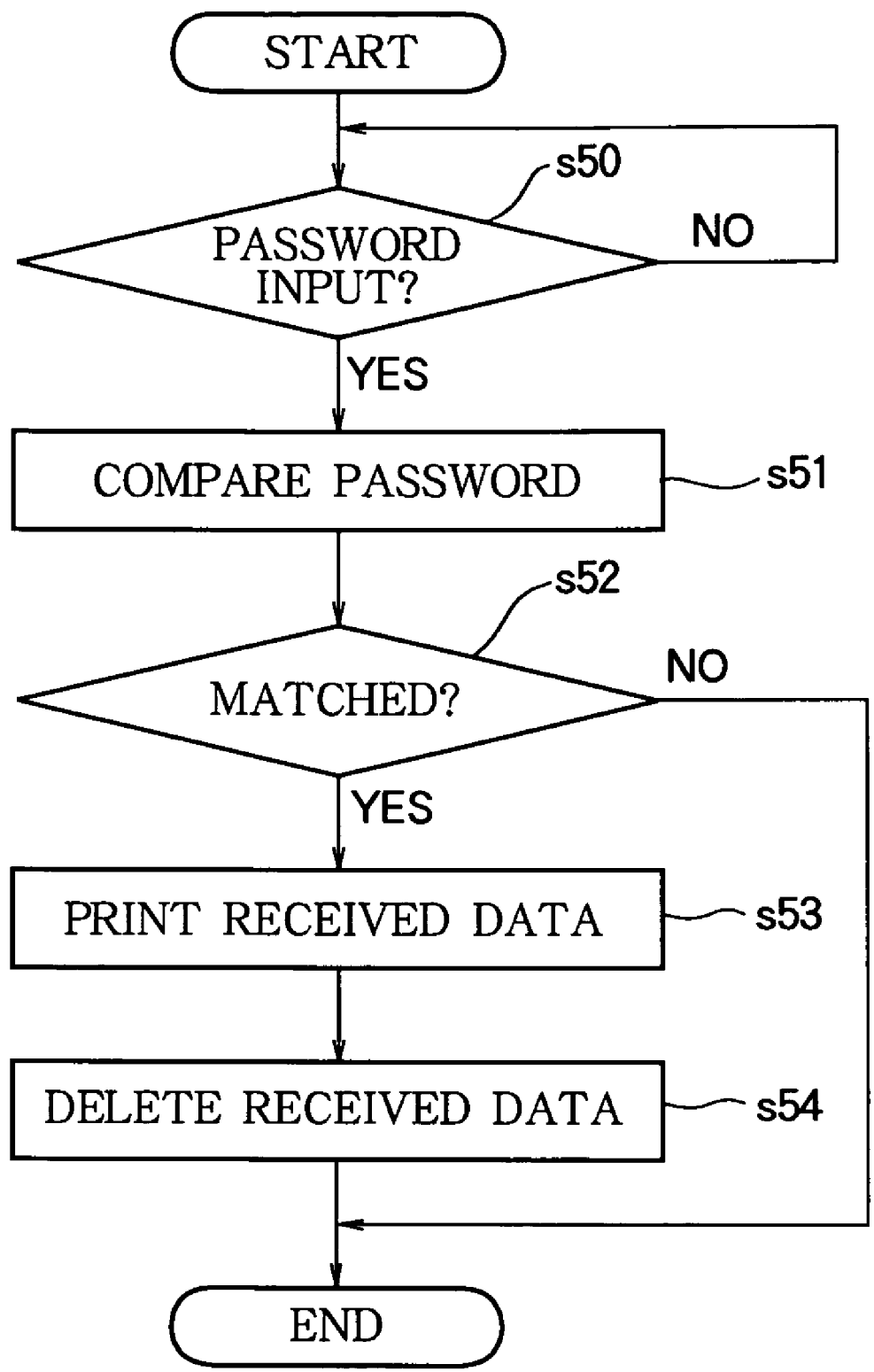
FIG. 12 is a flowchart illustrating operations from password input to data output.

The process from input of the password to the facsimile machine 1 by the intended recipient, who receives the password via the personal computer 11 or the telephone 13, to output of the image data is illustrated in the flowchart in FIG. 12.

The facsimile machine 1 waits for password input via the password input unit 15 (step s50). When the password input unit 15 receives a password ('Yes' in step s50), the password comparison unit 14 searches the correspondence table 52 for a password identical to the input password (step s51). If the password comparison unit 14 cannot find an identical password ('No' in step s52), the facsimile machine 1 ends the process without outputting the image data. If the search is successful ('Yes' in step s52), the data output unit 16 reads the start address and end address of the image data corresponding to the input password from the correspondence table 52, reads the image data from the storage location in the received data store 51 specified by the start address and end address, and prints out the image data (step s53). When the data output unit 16 prints out the image data, the storage unit 5 deletes the image data from the received data store 51 and deletes the entry corresponding to the deleted image data from the correspondence table 52 (step s54).

As described above, in the first embodiment, the facsimile machine 1 can generate a different password for each item of received data, thereby preventing unauthorized third parties from using a stolen password to print the received data. In addition, since the facsimile machine 1 prints out the received data only in response to input of the password, the received data will not be printed out in the intended recipient's absence and carried away, or left lying unattended for anyone to see.

Moreover, legitimate users are spared the trouble of registering and remembering personal passwords and user IDs.

Next, two variations of the first embodiment will be described.

In the first variation, a plurality of notification destinations may be identified in a single item of received image data, in which case a different password is generated for each notification destination, and the notification destinations are notified of their passwords individually.

The facsimile machine (communication terminal device) in the first variation is similar to the facsimile machine 1 in the first embodiment but has a modified correspondence table 52 that can store multiple entries with the same received data number, start address, and end address, corresponding to different notification destinations for the same item of image data. Referring to FIG. 13, the modified correspondence table 52 has a received data number column, a password column, a start address column, and an end address column as in the first embodiment, but also has a notification e-mail address column and a notification telephone number column.

The operation of the facsimile machine in the first variation will now be described.

When the facsimile machine in the first variation receives image data and identifies a plurality of e-mail addresses as notification destinations for the received image data, the e-mail address extractor 61 extracts the plurality of e-mail addresses and passes them to the notification information generator 8. The text data generator 81 directs the password generator 7 to generate passwords. The password generator 7 generates a different random password for each extracted e-mail address and notifies the text data generator 81. Having received the e-mail addresses and the corresponding passwords, the text data generator 81 generates separate notification document data for informing each intended recipient by e-mail of the arrival of the facsimile transmission and of the recipient's password. The text data generator 81 then writes the different passwords into the password column of the correspondence table 52, all corresponding to the same received image data but each corresponding to a different notification e-mail address. The mail transmission control unit 9 transmits the appropriate notification document data to each extracted e-mail address.

The procedure for telephone transmission of the password is similar to the procedure for e-mail transmission described above. When the telephone number extractor 62 extracts a plurality of telephone numbers of notification destinations, it notifies the notification information generator 8 of each of the extracted telephone numbers. The voice data generator 82 directs the password generator 7 to generate passwords. The password generator 7 generates a different random password for each extracted telephone number and notifies the voice data generator 82. The voice data generator 82 then generates synthesized voice data for informing the intended recipients by telephone of the arrival of the facsimile transmission and of their passwords, and writes the different passwords into the password column of the correspondence table 52, corresponding to the same received image data but to different extracted telephone numbers. The voice transmission control unit 12 dials each of the extracted telephone numbers, waits for a connection with the intended recipient's telephone 13, and informs the intended recipient by synthesized voice of the arrival of the facsimile transmission and of the password corresponding to the extracted telephone number.

The first variation provides the same effects as the first embodiment in preventing unintended users from printing out received facsimile image data and carrying the resulting printed documents away, but also allows a plurality of intended recipients of a single facsimile transmission to print out separate copies of the transmitted document. By generating a different password for each intended recipient, the first variation can prevent an unintended user from using the password entered by an intended recipient to obtain unauthorized additional copies of the document.

Next, the second variation will be described.

In the second variation, when the same notification destination is identified for items of image data received in a given period of time, the same password is generated for each item of image data.

Figure 14:
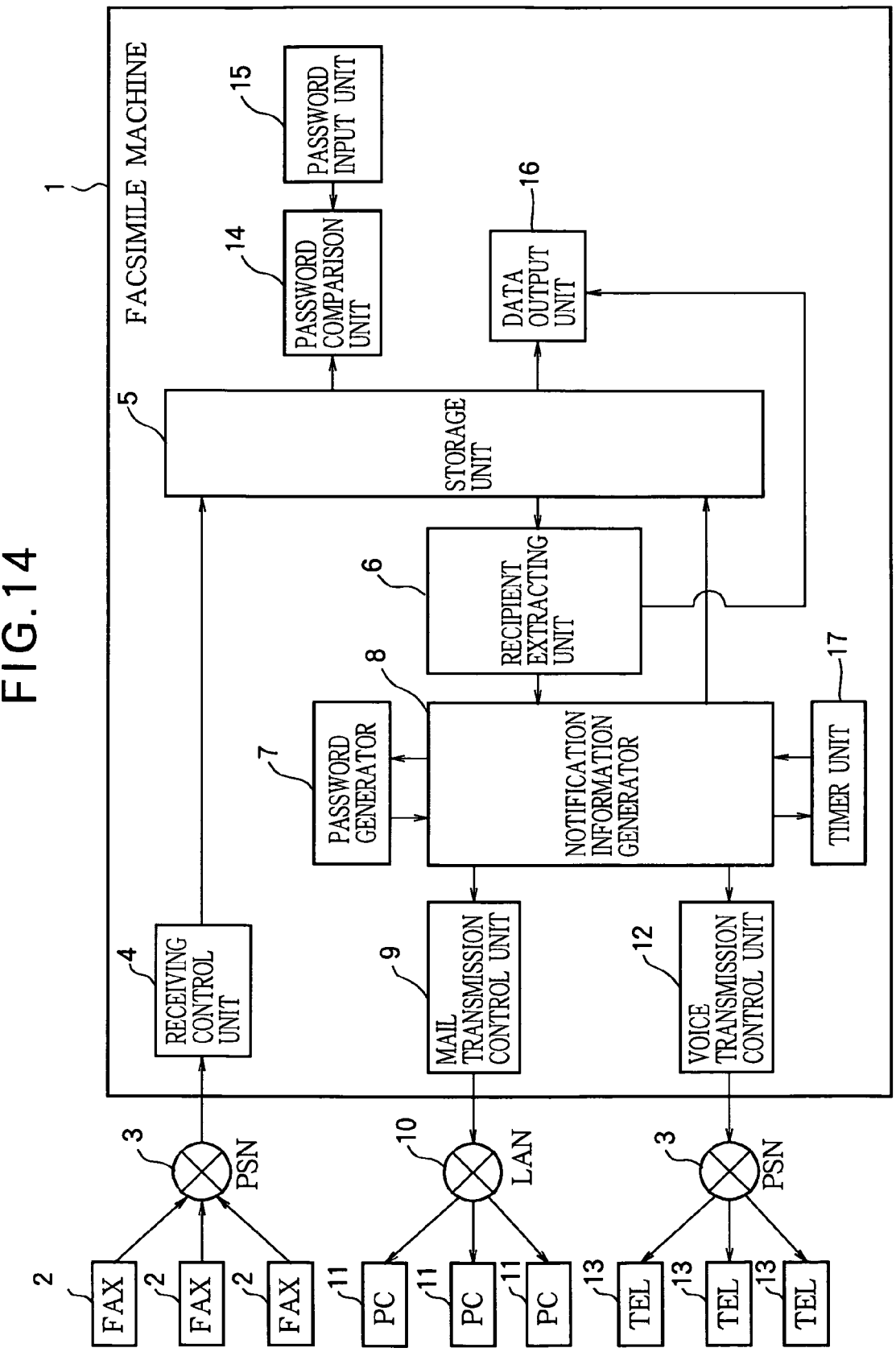
FIG. 14 is a block diagram illustrating the structure of a facsimile machine in a second variation of the first embodiment.

Referring to FIG. 14, the facsimile machine (communication terminal device) in the second variation is similar to the facsimile machine 1 in the first embodiment but has a modified correspondence table, and a timer 17 that notifies the notification information generator 8 of the date and time at which the password generator 7 generates a password.

Referring to FIG. 15, the modified correspondence table 52 has a received data number column, a password column, a start address column, and an end address column as in the first embodiment, but also has a notification e-mail address column, a notification telephone number column, and a password generation time column.

The operation of the facsimile machine in the second variation will now be described.

When the facsimile machine in the second variation receives image data, the e-mail address extractor 61 extracts the e-mail address from the received image data and passes it to the notification information generator 8. The notification information generator 8 searches the notification e-mail address column in the correspondence table 52 for an e-mail address identical to the extracted e-mail address. If the search is successful, the notification information generator 8 checks the password generation time corresponding to the identical e-mail address. If the listed password generation time is within a given preceding period (for example, a one-day period), the text data generator 81 generates document data informing the intended recipient by e-mail of the arrival of the new facsimile transmission and repeating the previously generated password. In FIG. 15, for example, since the two items of image data with received data numbers 1 and 3 have the same notification destination and were received on the same day, the same password-1 is reused for the image data with received data number 3. The text data generator 81 writes this same password into the password column of the correspondence table 52, and writes the time at which the password was assigned to the new item of image data into the password generation time column, thereby generating the same password for the new image data. The mail transmission control unit 9 transmits the generated document data by e-mail to the personal computer 11 of the intended recipient.

When the notification destination identified for the received image data is not the same as the notification destination for any other image data received within the given period of time, the text data generator 81 directs the password generator 7 to generate a new password. The random number generator 71 generates a random password and notifies the text data generator 81, which then generates document data for informing the intended recipient by e-mail of the arrival of the facsimile transmission and of the recipient's password. The text data generator 81 also refers to the timer 17 to identify the password generation time, and writes the e-mail address, password, and password generation time into the correspondence table 52. The mail transmission control unit 9 transmits the generated document data to the personal computer 11 of the intended recipient.

If the notification destination (e-mail address) is the same as for a previously received item of image data but the given period of time has expired, a different password is generated. In FIG. 15, for example, if a one-day period is set as the given period of time, even though the image data with received data numbers 1 and 4 have the same notification destination (e-mail address), the interval between them is longer than one day, so a different password-3 is used for the image data with received data number 4.

The procedure for telephone transmission of the password is similar to the procedure for e-mail transmission described above. The telephone number extractor 62 extracts a telephone number from received image data and passes it to the notification information generator 8. The notification information generator 8 searches the notification telephone number column in the correspondence table 52 for a telephone number identical to the extracted telephone number. If the search is successful, the notification information generator 8 checks the password generation time corresponding to the identical telephone number. If the corresponding password was generated within a given period of time, the voice data generator 82 generates synthesized voice data for informing the intended recipient by telephone of the arrival of the facsimile transmission and of the previously generated password, writes that password into the password column of the correspondence table 52, and writes the time at which the password was assigned to the currently received image data into the password generation time column. The voice transmission control unit 12 dials the extracted telephone number, waits for a connection with the intended recipient's telephone 13, and informs the intended recipient by synthesized voice of the arrival of the facsimile transmission and of the password.

When the notification destination identified for an item of image data is not the same as the notification destination for any other item of image data received within the given period of time, the text data generator 81 directs the password generator 7 to generate a new password. The random number generator 71 generates a random password and notifies the text data generator 81, which then generates synthesized voice data for informing the intended recipient by telephone of the arrival of the facsimile transmission and of the new password. The voice data generator 82 also refers to the timer 17 to identify the password generation time, and writes the telephone number, password, and password generation time into the correspondence table 52. The voice transmission control unit 12 dials the extracted telephone number, waits for a connection with the intended recipient's telephone 13, and informs the intended recipient by synthesized voice of the arrival of the facsimile transmission and of the new password.

If the notification destination (telephone number) is the same as for a previously received item of image data but the given period of time has expired, a different password is generated. If a one-day period is set for the given period of time, items of image data having the same notification destination (telephone number) but received at intervals of more than one day are assigned different passwords.

The second variation provides the same effects as the first embodiment, but also saves trouble for a person to whom a plurality of facsimile transmissions are sent within a given period of time, since the person does not have to remember a different password for each facsimile transmission.

The length of the period of time during which the same password is used is preferably adjusted according to the frequency of use of the password.

The length of this period may also be adjusted according to the interval that elapses between notification and deletion of the password. This is the interval from the time at which the intended recipient is notified until the intended recipient enters the password into the facsimile machine and the printing of the transmitted document is completed (at which point the password becomes invalid). The frequency with which the same password may be assigned to different documents should be greater or less as this interval is longer or shorter.

In the first embodiment, when the intended recipient enters the password into the facsimile machine and prints out the transmitted document, the password and the corresponding received data number, start address, and end address in the correspondence table 52 may be deleted by being flagged as invalid, or by being overwritten with, for example, all-zero data. A similar deletion procedure may be used for the notification e-mail address, notification telephone number, and password generation time in the variations in FIGS. 13 and 15.

Next, a second embodiment of the invention will be described.

Figure 16:
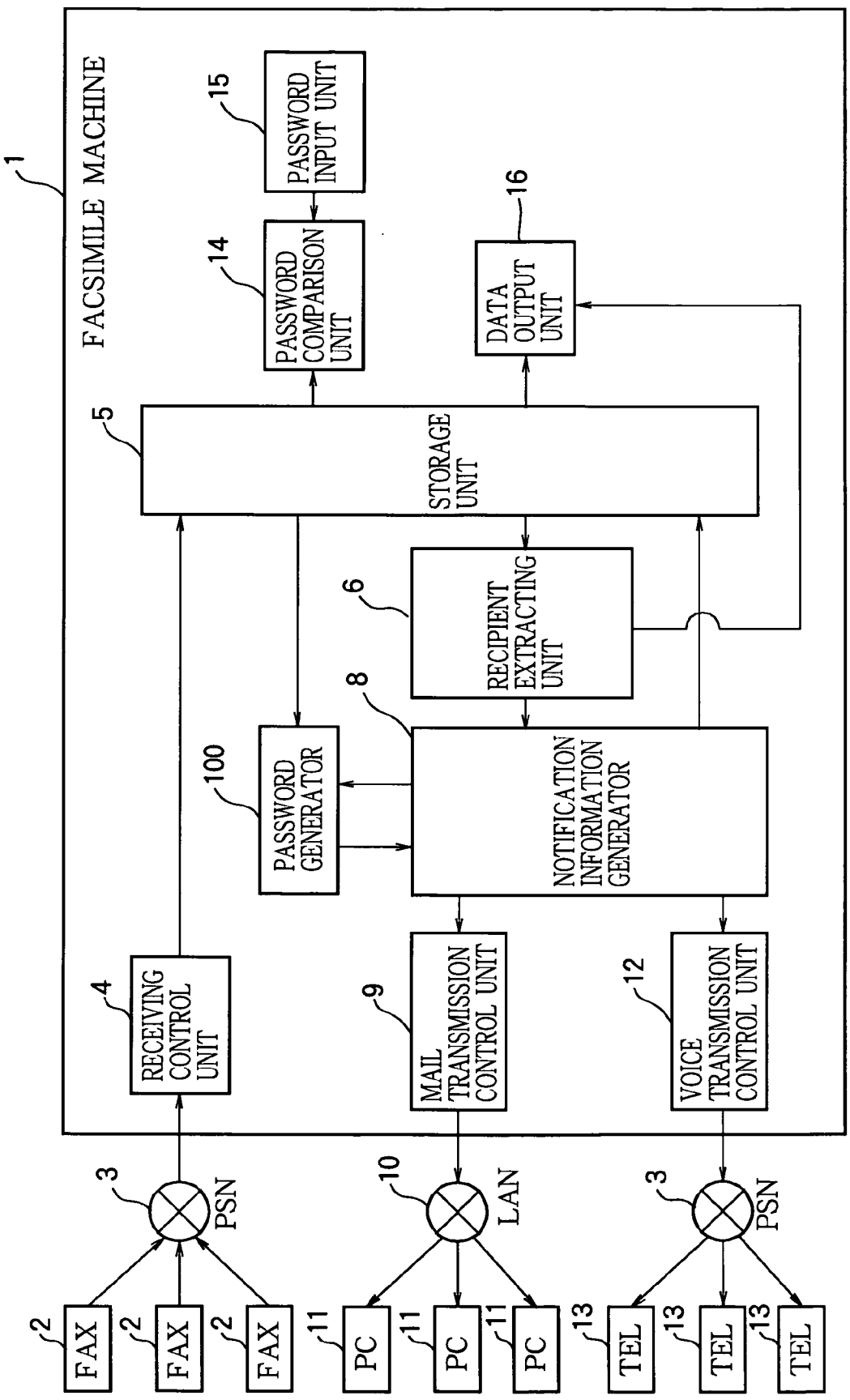
FIG. 16 is a block diagram illustrating the structure of a facsimile machine in a second embodiment of the invention.

Referring to FIG. 16, the facsimile machine (communication terminal device) in the second embodiment is similar to the facsimile machine 1 in the first embodiment but has a different password generator 100.

Figure 17:
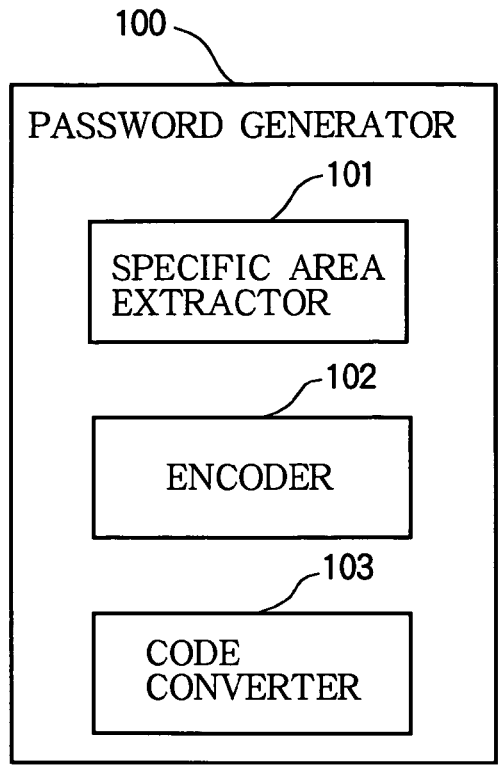
FIG. 17 is a block diagram illustrating the structure of the password generator in FIG. 16.

Referring to FIG. 17, the password generator 100 in the second embodiment includes a specific area extractor 101, an encoder 102, and a code converter 103.

Figure 18:
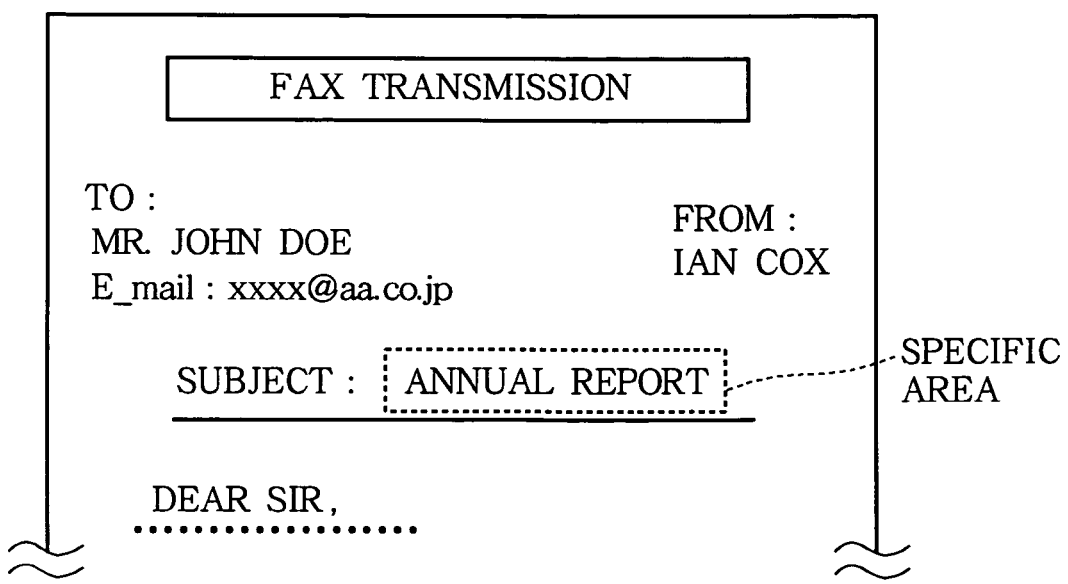
FIG. 18 shows exemplary received data.

When the notification information generator 8 directs the password generator 100 to generate a password, the specific area extractor 101 reads the image data from the storage location in the received data store 51 (FIG. 2) and finds a specific area in the image data. In FIG. 18 the specific area, enclosed by the dotted line, is a subject field following a character string such as 'Subject' and containing a character string, such as 'Annual Report', for example, informing the recipient of the subject of the facsimile transmission. The specific area extractor 101 recognizes the character string 'Subject' and extracts the content of the specific area that follows.

When the specific area extractor 101 has extracted the content of the specific area, the encoder 102 encodes the extracted content. In the second embodiment, the content is extracted as image data (bitmapped data) and encoded by a compressive coding method. The encoding method specified by the Joint Bi-level Image Experts Group (JBIG) or the Joint Photographic Experts Group (JPEG), the Tagged Image File Format (TIFF) method and other well-known methods may be used.

The code converter 103 converts the encoded data to character codes, and thereby generates a character-code password for the received image data.

The specific area is not restricted to a subject area as illustrated in FIG. 18. An area giving the facsimile sender's name or telephone number may be used instead. Alternatively, the information in one specific area, the sender's telephone number, for example, may be used as an encryption key for encrypting the image data in another specific area. In addition, instead of converting all of the compressed data to character codes, part of the compressed data may be selected from a predetermined location or an arbitrary location and converted to character codes.

Next, the operation of the facsimile machine in the second embodiment will be described. The facsimile machine 1 in the second embodiment operates in the same way as in the first embodiment except for the operation of the password generator 100, so only the operation of the password generator 100 will be described.

Figure 19:
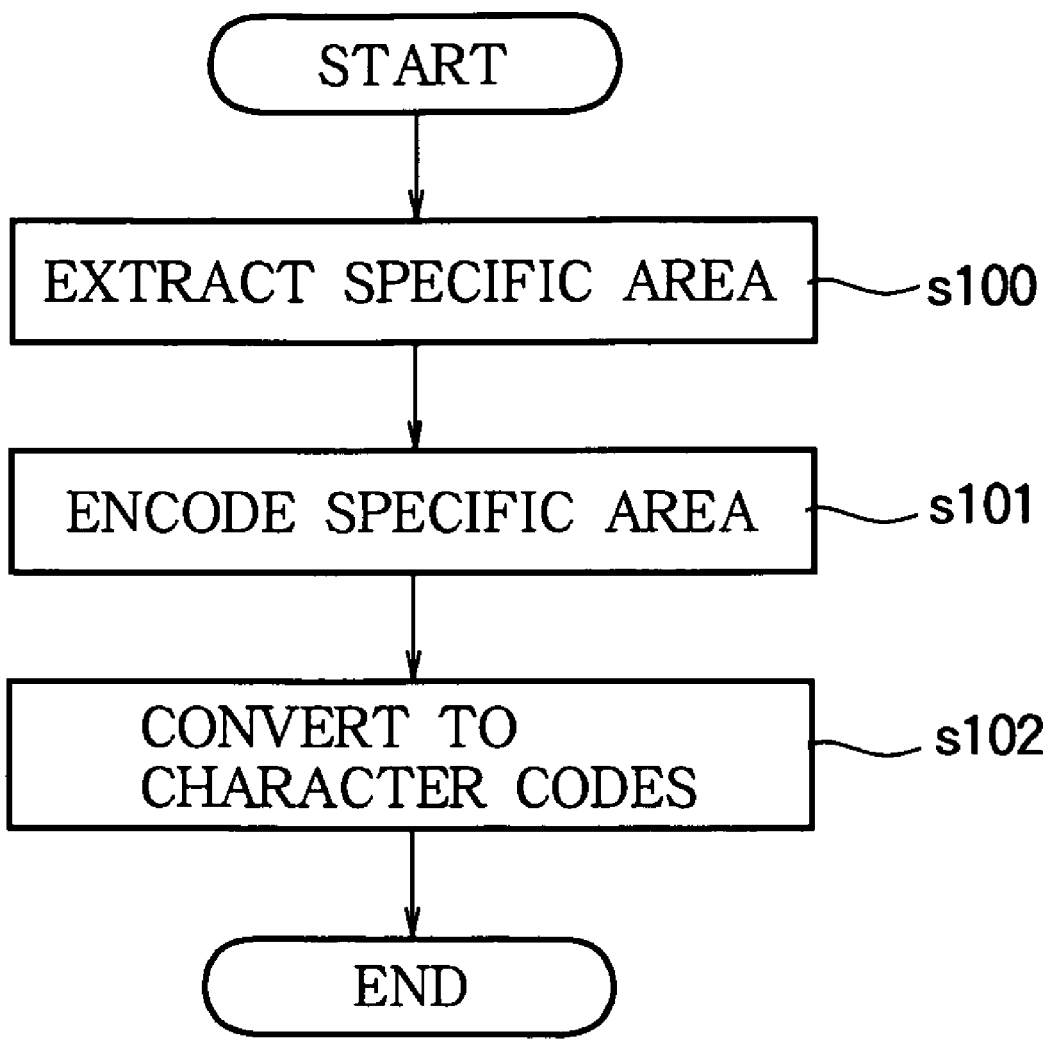
FIG. 19 is a flowchart illustrating the password generating process in the facsimile machine in the second embodiment.

Referring to FIG. 19, when the notification information generator 8 directs the password generator 100 to generate a password, the specific area extractor 101 reads the image data from the storage location in the received data store 51, and extracts the content of a specific area from the image data (step s100). The encoder 102 then compresses the extracted image data to generate encoded data (step s101). The code converter 103 converts the encoded data to character codes, thereby generates a character-code password for the received image data, and notifies the notification information generator 8 (step s102), which uses the password as described in the first embodiment.

The second embodiment provides the same effects as the first embodiment, but also prevents third parties from predicting the password. Being generated from the compressed image data in a specific area in each received facsimile transmission, the password is truly random.

The first and second embodiments are not restricted to use in facsimile machines; they may also be used in, for example, a copier-based multifunction peripheral (MFP) or a copier machine, or any type of information terminal device that outputs any type of received data, to ensure that the data can only be output by the intended recipient. The output need not be printed output; transfer of the received data to a computing device, communication device, or data storage device is also a type of output.

Those skilled in the art will recognize that further variations are possible within the scope of the invention, which is defined in the appended claims.

What is claimed is:

1. A facsimile machine comprising:
   an assigning unit for generating a password for received data and assigning the generated password to the received data;
   a storage unit for storing the received data to which the password is assigned;
   an extracting unit for extracting information for identifying a notification destination of the received data;
   a notification unit for notifying the notification destination of the password, by using the information extracted by the extracting unit; and an output unit for outputting the received data to which the password is assigned responsive to input of the password, wherein the storage unit further stores the notification destination of the received data and time relating to the received data;

wherein the notification unit checks if there is a notification destination of the previously received data in the storage unit which is identical to the notification destination of the newly received data, and obtains time relating to the received data corresponding to the identical notification destination; and wherein, when the notification unit determines that the time relating to the received data is within a given preceding period of time, the assigning unit assigns the same password as previously generated password to the newly received data.

2. The facsimile machine of claim 1, wherein the assigning unit generates the password by encoding part of the received data.

3. The facsimile machine of claim 1, wherein the extracted information is an electronic mail address of the notification destination and the notification unit transmits the password by electronic mail.

4. The facsimile machine of claim 1, wherein the extracted information is a telephone number of the notification destination, and wherein the assigning unit generates voice data including the password, and the notification unit transmits the voice data including the password by telephone.

5. The facsimile machine according to claim 1, wherein the extracting unit extracts from the received data information for identifying a notification destination of the received data.

6. The facsimile machine according to claim 1, wherein, when said extracting unit cannot extract information for identifying a notification destination of the received data, the output unit outputs the received data without a password.

7. The facsimile machine according to claim 1, wherein a length of the period of time during which the same password is used can be set according to an interval after notification of password and before a recipient enters the password.

8. The facsimile machine according to claim 1, wherein the extracting unit extracts specific information from the received data, and the assigning unit generates a password based on the specific information.

9. The facsimile machine according to claim 8, wherein the specific information contains a subject of the received data.

10. The facsimile machine according to claim 8, wherein the specific information contains sender's information.

11. The facsimile machine according to claim 10, wherein the sender's information contains sender's name.

12. The facsimile machine according to claim 10, wherein the sender's information contains sender's telephone number.

13. A communication terminal device comprising:

an assigning unit for generating a password for received data and assigning the generated password to the received data;

a storage unit for storing the received data to which the password is assigned;

an extracting unit for extracting information for identifying a notification destination of the received data;

a notification unit for notifying the notification destination of the password, by using the information extracted by the extracting unit; and an output unit for outputting the received data to which the password is assigned responsive to input of the password, wherein the storage unit further stores the notification destination of the received data and time relating to the received data;

wherein the notification unit checks if there is a notification destination of the previously received data in the storage unit which is identical to the notification destination of the newly received data, and obtains time relating to the received data corresponding to the identical notification destination; and wherein, when the notification unit determines that the time relating to the received data is within a given preceding period of time, the assigning unit assigns the same password as previously generated password to the newly received data.

14. The communication terminal device of claim 13, wherein the assigning unit generates the password by encoding part of the received data.

15. The communication terminal device of claim 13, wherein the extracted information is an electronic mail address of the notification destination and the notification unit transmits the password by electronic mail.

16. The communication terminal device of claim 13, wherein the extracted information is a telephone number of the notification destination, and wherein the assigning unit generates voice data including the password, and the notification unit transmits the voice data including the password by telephone.

17. The communication terminal device according to claim 13, wherein the extracting unit extracts from the received data information for identifying a notification destination of the received data.

18. The communication terminal device according to claim 13, wherein, when said extracting unit cannot extract information for identifying a notification destination of the received data, the output unit outputs the received data without a password.

19. The communication terminal device according to claim 13, wherein a length of the period of time during which the same password is used can be set according to an interval after notification of password and before a recipient enters the password.

20. The communication terminal device according to claim 13, wherein the extracting unit extracts specific information from the received data, and the assigning unit generates a password based on the specific information.

21. The communication terminal device according to claim 20, wherein the specific information contains a subject of the received data.

22. The communication terminal device according to claim 20, wherein the specific information contains sender's information.

23. The communication terminal device according to claim 22, wherein the sender's information contains sender's name.

24. The communication terminal device according to claim 22, wherein the sender's information contains sender's telephone number.

* * * * *